US008232690B2

(12) United States Patent
Overstreet

(10) Patent No.: US 8,232,690 B2
(45) Date of Patent: Jul. 31, 2012

(54) MAGNETIC DRIVE ENGINE

(76) Inventor: John Howard Overstreet, Abilene, TX (US)

(*) Notice: Subject to any disclaimer, the term of this patent is extended or adjusted under 35 U.S.C. 154(b) by 18 days.

(21) Appl. No.: 12/074,461

(22) Filed: Mar. 5, 2008

(65) Prior Publication Data

US 2009/0224614 A1    Sep. 10, 2009

(51) Int. Cl.
*H02K 33/00* (2006.01)
*H02K 33/10* (2006.01)
*H02K 33/14* (2006.01)

(52) U.S. Cl. .......... 310/15; 310/19; 310/23; 310/24; 310/33; 310/34; 310/35; 310/37

(58) Field of Classification Search .......... 310/15, 310/19, 23–24, 33–35, 37; 318/119
See application file for complete search history.

(56) References Cited

U.S. PATENT DOCUMENTS

| | | | | |
|---|---|---|---|---|
| 4,523,114 A * | 6/1985 | Smith | | 310/24 |
| 5,592,036 A * | 1/1997 | Pino | | 310/24 |
| 6,128,819 A * | 10/2000 | Bates | | 29/888.011 |
| 6,220,216 B1 * | 4/2001 | Haberlein | | 123/196 R |
| 2002/0121815 A1 * | 9/2002 | Sullivan | | 310/33 |
| 2006/0082226 A1 * | 4/2006 | Protze | | 310/14 |
| 2007/0057794 A1 * | 3/2007 | Gisselberg et al. | | 340/572.5 |

* cited by examiner

*Primary Examiner* — Tran N Nguyen
*Assistant Examiner* — Jose A Gonzalez Quinones
(74) *Attorney, Agent, or Firm* — Delphine James

(57) ABSTRACT

The present invention replaces the internal combustion engine utilizing a conventional 12 voltage system that is used in automobiles today. The combustion engine can be a 90 degree V-Type or Inline type of cylinder block. This magnetic drive engine of the present invention comprises a head assembly supported by a cylinder engine block. The cylinder block houses the pistons and the head assembly houses a plurality of corresponding plug assemblies. Each plug assembly has an electromagnet on its bottom end which switches polarity based upon the polarity sent by the sensors on the crankshaft. By integrating the mechanics and the electromagnetism needed to push and pull the magnets on the pistons, the plug assembly is a staging area, for the coils and rods (mediums), to initiate the changing of polarity. A computer controls the switching of polarity and voltage needed for top performance.

5 Claims, 8 Drawing Sheets

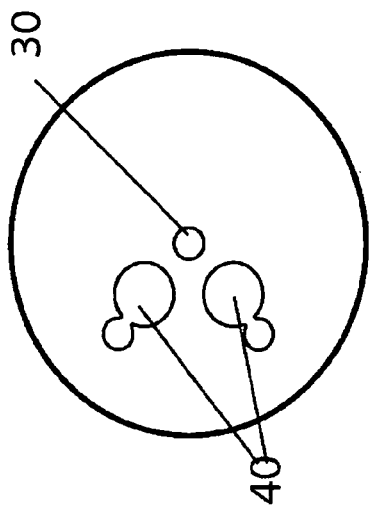
FIGURE 1c
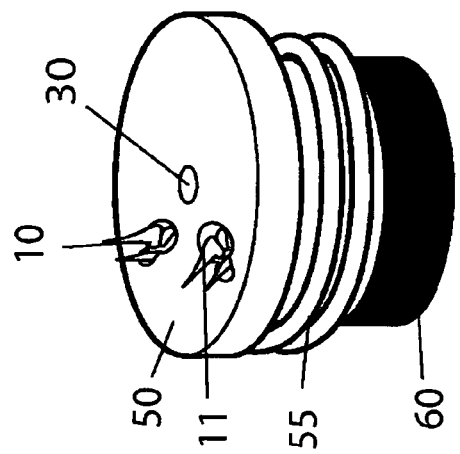
FIGURE 1e
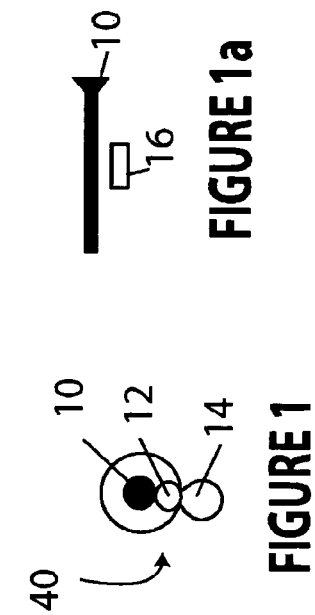
FIGURE 1a
FIGURE 1
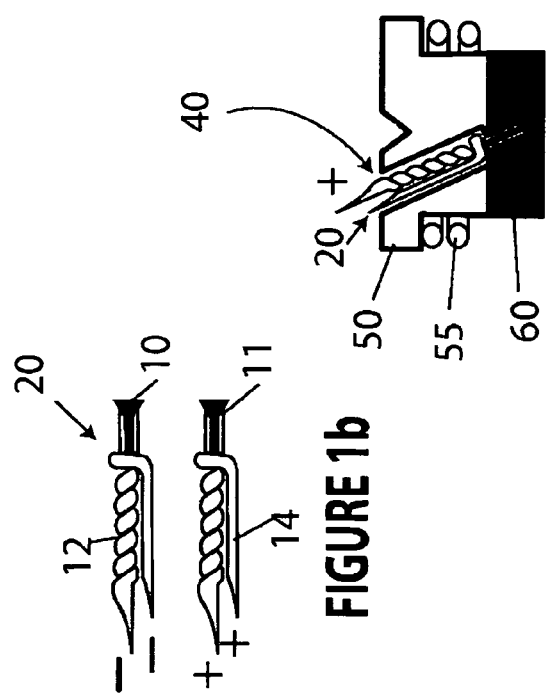
FIGURE 1d
FIGURE 1b

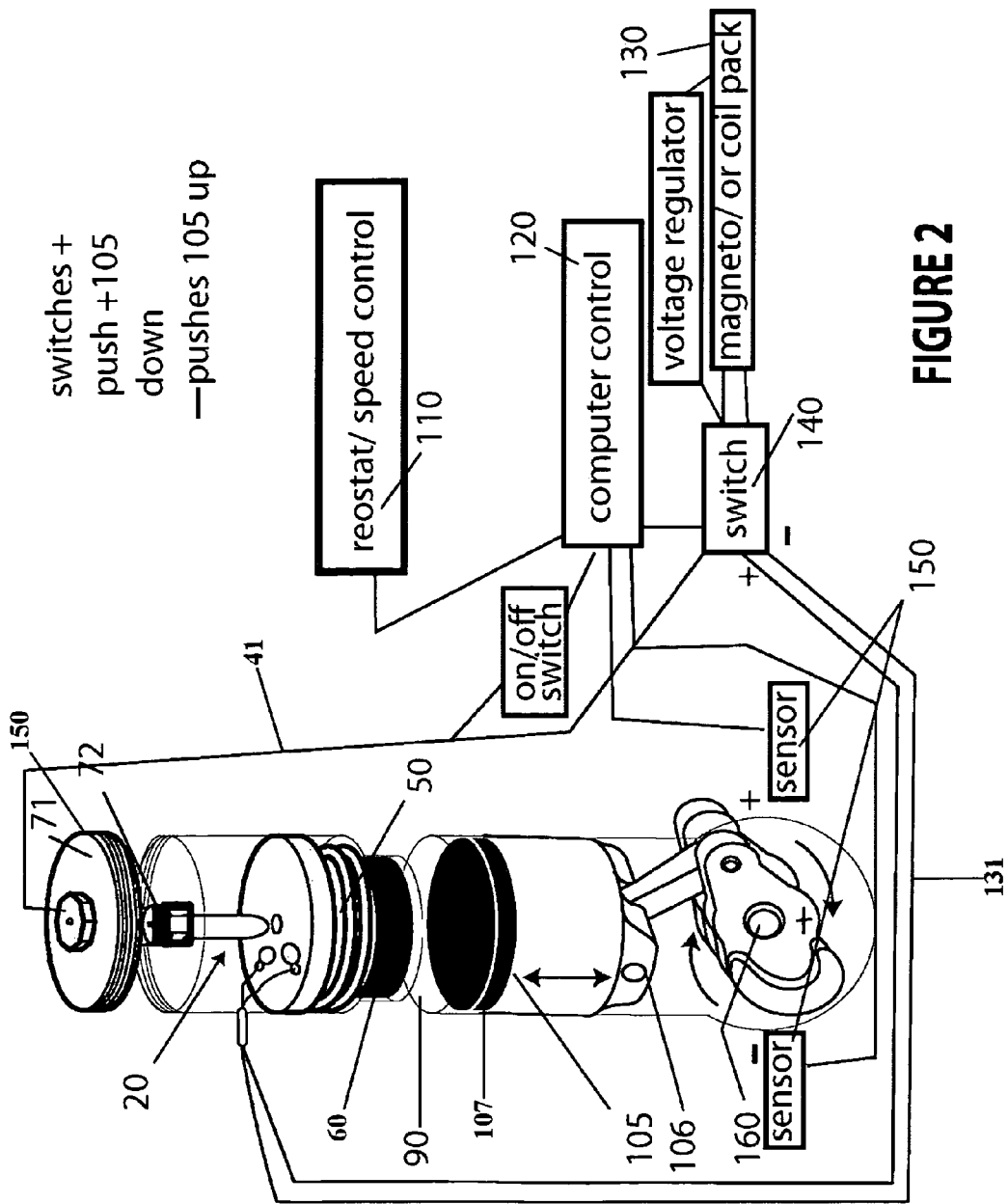

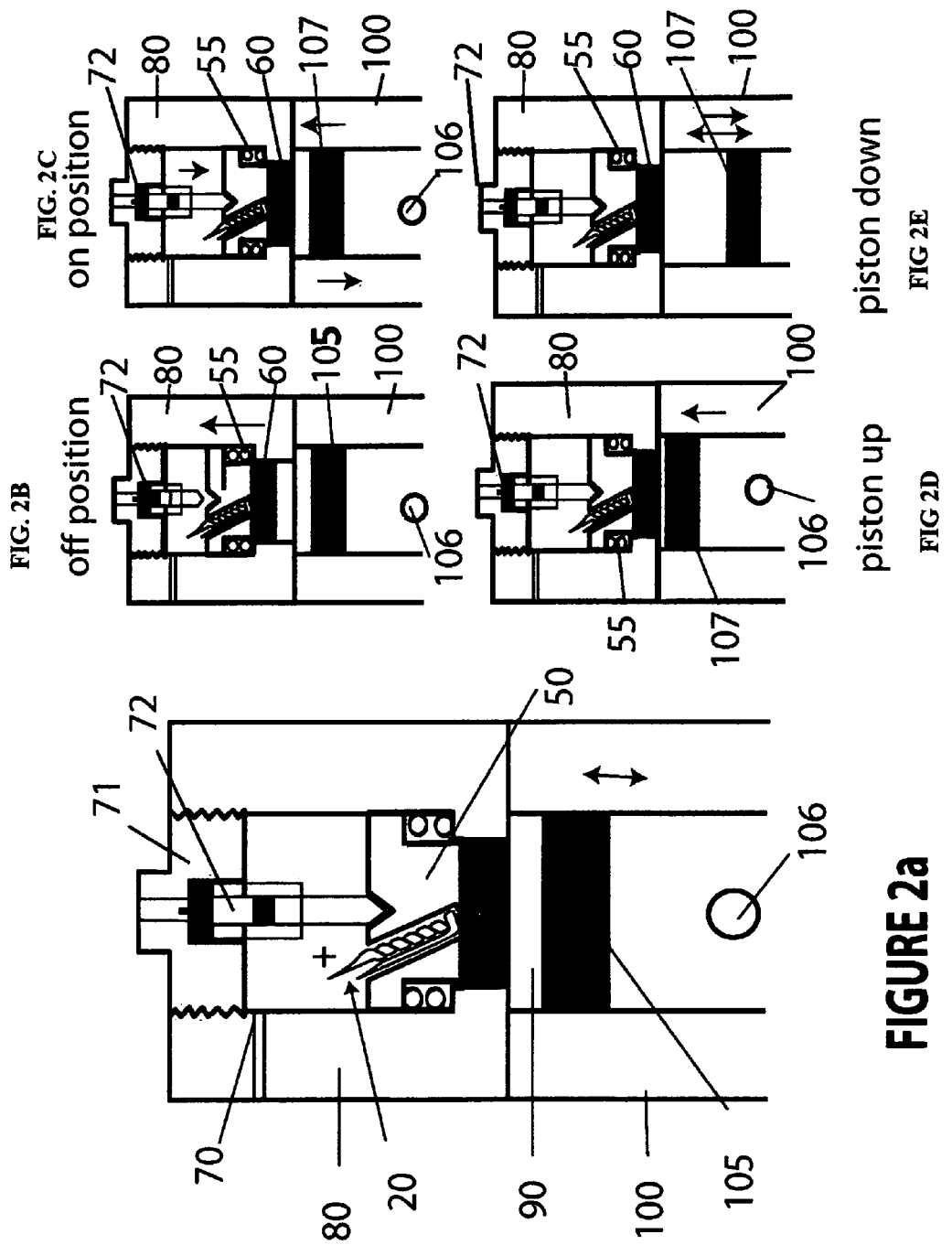

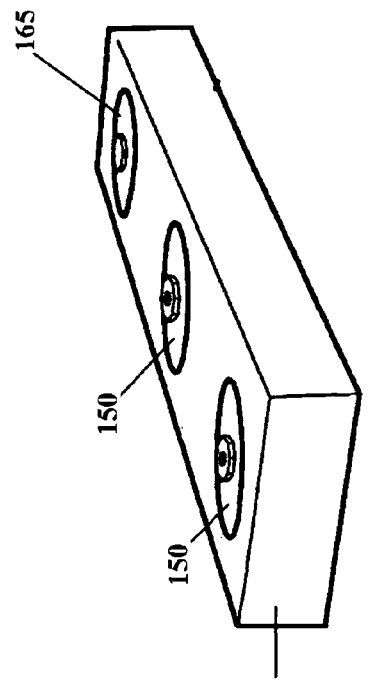
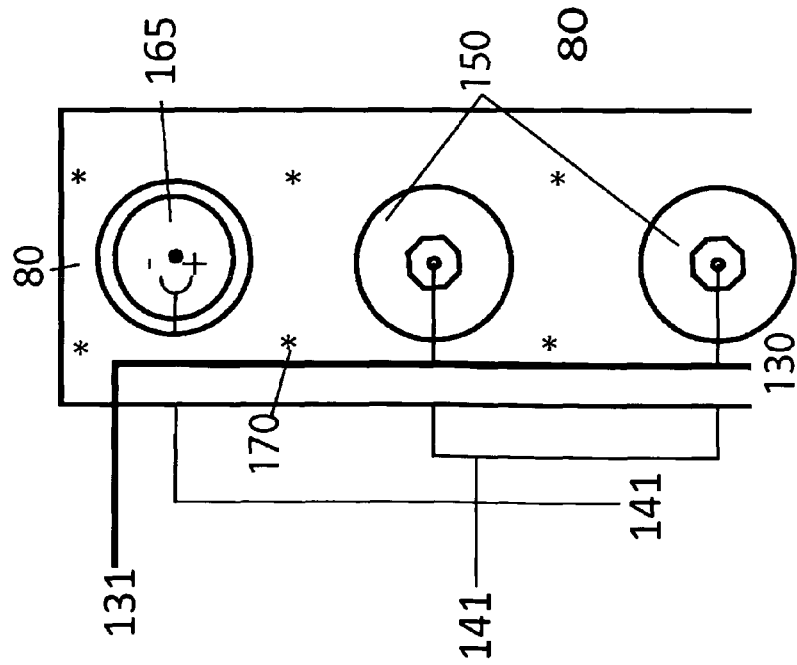
FIGURE 3a
FIGURE 3

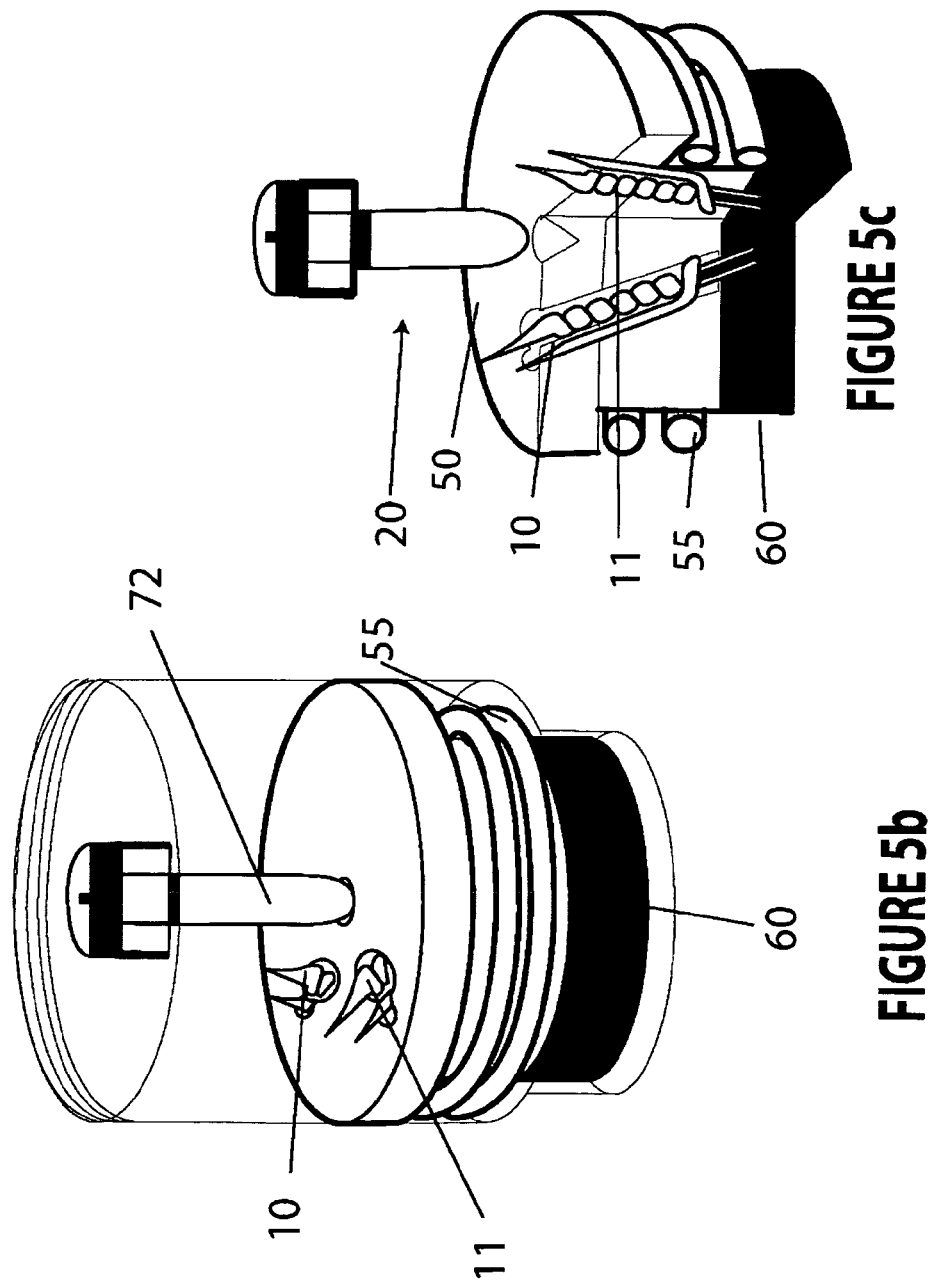

MAGNETIC DRIVE ENGINE

FIELD OF THE INVENTION

The present invention relates to the "Magnetic Drive Engine" that works on the principle of magnetism. This method provides an environment friendly, very high efficient engine that can complement or replace any engines that use fossil fuel, bio-fuel, solar power, wind power, hydro power, electricity, stored energy, or other energy sources.

BACKGROUND OF THE INVENTION

Throughout the centuries, different methods for propelling a vehicle have been discovered and used. For many vehicles, the Internal Combustion Engine is the current engine of choice. In the Internal Combustion Engine, the reciprocating motion generated by the linear movement of one or more pistons is converted to the rotational motion with the help of a crankshaft assembly. The gasoline used as fuel is converted into motion by the engine. The engine burns the gasoline inside the vehicle using a four stoke combustion cycle.

With the diminishing fossil fuel resources, the increase in energy costs, and the environmental concerns, engines using alternate energy sources such as bio-fuel, solar power, wind power, etc. are being developed. The present invention uses the force of magnetism to power an automobile.

SUMMARY OF THE INVENTION

The present invention replaces the internal combustion engine utilizing a conventional 12 voltage system that is used in automobiles today. The combustion of the present invention comprises a head assembly supported by a cylinder engine block. The cylinder block houses the pistons and the head assembly houses a plurality of corresponding plug assemblies. Each plug assembly has an electromagnet on its bottom end which switches polarity based upon the polarity sent by the sensors mounted upon the crankshaft. Using the actuator, each plug assembly is engaged and locked into place. Once each plug assembly is engaged, this creates a magnetic moment causing the initiation of the switching of the polarity of the electromagnet from positive to negative and back again.

As the crankshaft rotates, sensors on the crankshaft send signals to a computer which relays that information to a power source (a magneto) thereby causing the upward and downward movement of the pistons within the cylinder block. Additionally, the power source can be a conventional voltage regulator and coil pack. The rotational movement of the crankshaft gives the direction and magnitude of a magnetic force required to power the engine. The present invention employs the use of the electromagnetic field and it's applications in an ability to reliably to and to successfully operate the Magnetic drive engine for its introduction into the automotive industry.

BRIEF DESCRIPTION OF DRAWINGS

FIG. 1 illustrates a top view of key way to house, coil, and rod.
FIG. 1a illustrates a Side view of rod and sleeve.
FIG. 1b illustrates a Side view of rod within coil.
FIG. 1c illustrates a Top view of Plug Assembly showing an (a) aligning hole for actuator and
(b) keyway holes for coils and rod with plastic sleeve.
FIG. 1d illustrates a Cross-Sectional view of top of plug assembly with the spring.
FIG. 1e illustrates a Perspective view of Plug Assembly depicted the following: (a) plug (b) spring (c) electro-magnet (d) coil & rod (medium), (1) paramagnetic medium (+) or (2) ferromagnetic medium (+) and The coil & diamagnetic medium (−).
FIG. 2 illustrates a Perspective view of present invention.
FIG. 2a illustrates a Cross-sectional view of head and block
FIG. 2b illustrates a Cross-sectional view of actuator off position
FIG. 2c illustrates a Cross-sectional view of actuator in on position
FIG. 2d illustrates a Cross-sectional showing piston in an up piston and plug assembly.
FIG. 2e illustrates a Cross-sectional showing piston in down position
FIG. 3 illustrates a Top view of head assembly.
assembly depicting the following: a) head (partial view-one side) (b) wires to actuators (c) wires to coils (d) fasteners (e) plug assembly (top view) showing wire connections to coils (x) holes for mounting to cylinder block.
FIG. 3a illustrates a Perspective view of Head assembly showing the following (a) head (b) plug assembly (c) coil wire (+) connections
FIG. 5b illustrates a perspective view of plug assembly
FIG. 5c illustrates a Cutaway view of plug assembly
Head assembly (a) head (b) plug assembly (c) coil wire (+) connections
(d) actuator (e) actuator wire connection (f) fastener. Wires not shown, coil & rod diamagnetic medium (−), are not shown. Block assembly (partial view, (g) block (h) cylinder (i) piston with 1" thick magnet, (+) side up (j) piston pin.

DETAILED DESCRIPTION OF INVENTION

Figure 5:
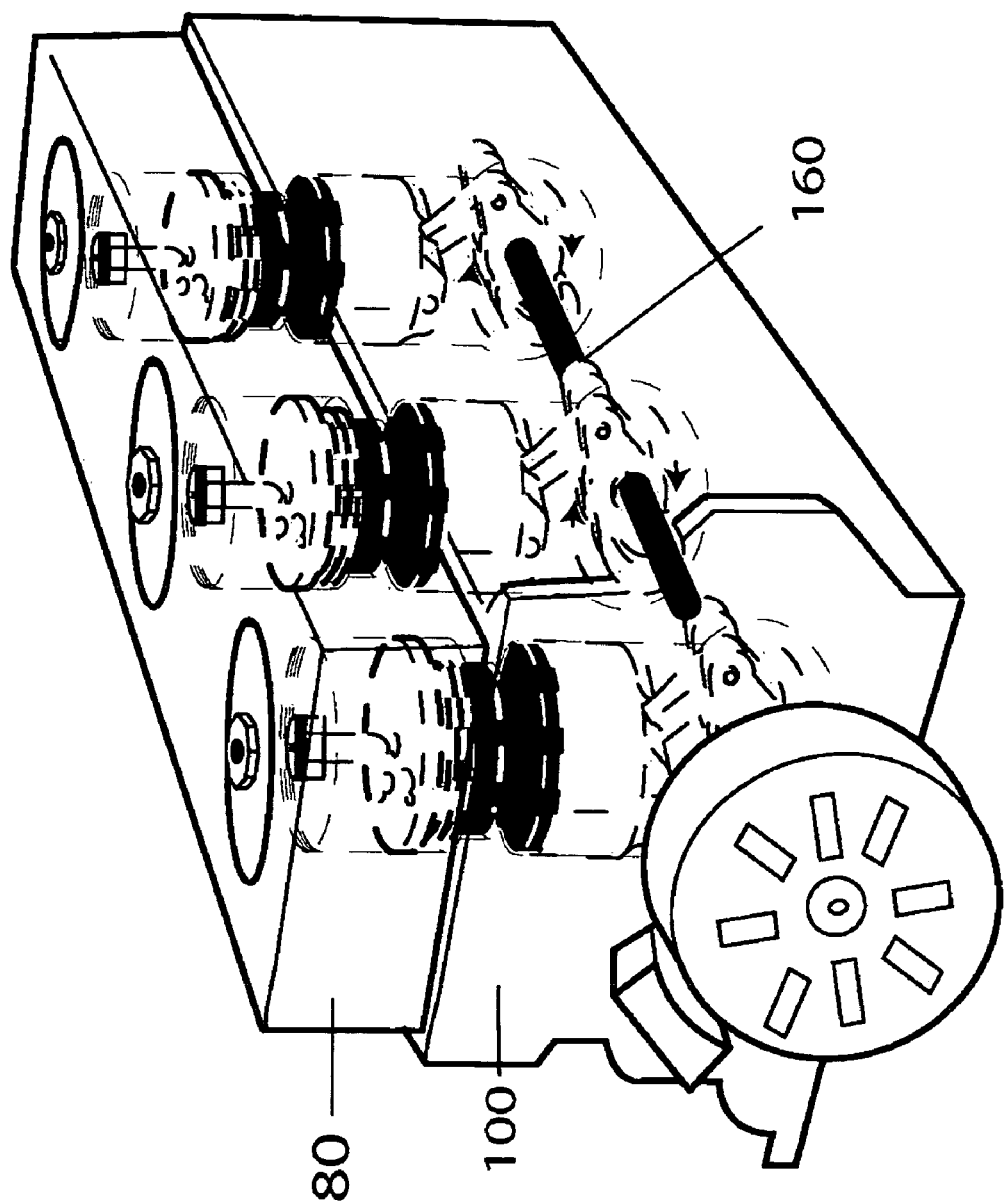
FIG. 5 illustrates a Perspective view of invention in an engine block

The present invention is a specific design of the Internal Combustion Engine. The core of the conventional Internal Combustion Engine is the cylinders containing the plurality of pistons that moves upward and downward. The majority of automobiles have more than one cylinder. Generally, Cylinders can be arranged in inline, V-type, or flat. In an inline or flat arrangement, the cylinders are arranged in a line in a single bank. In the V arrangement, the cylinders are arranged in two banks set at an angle to one another. As shown in FIG. 5, the illustrated embodiment discloses an inline arrangement. However, the present invention can be implemented in a 90° to 120° V type arrangement.

Referring to FIG. 5, there is shown a perspective view of the present invention. The present invention comprises a head assembly (80) disposed atop the block assembly (100). As shown, the block assembly (100) is capped off by the head assembly (80).

As shown in FIG. 5, the head assembly (80) is adapted to support a plurality of plug assemblies (50). As further depicted, the pistons (105) and cylinders (90) are housed inside the block assembly (100). In the present invention, the piston (105) is a cylindrical molded carbonized plastic that moves up and down inside the cylinder (90).

Figure 5A:
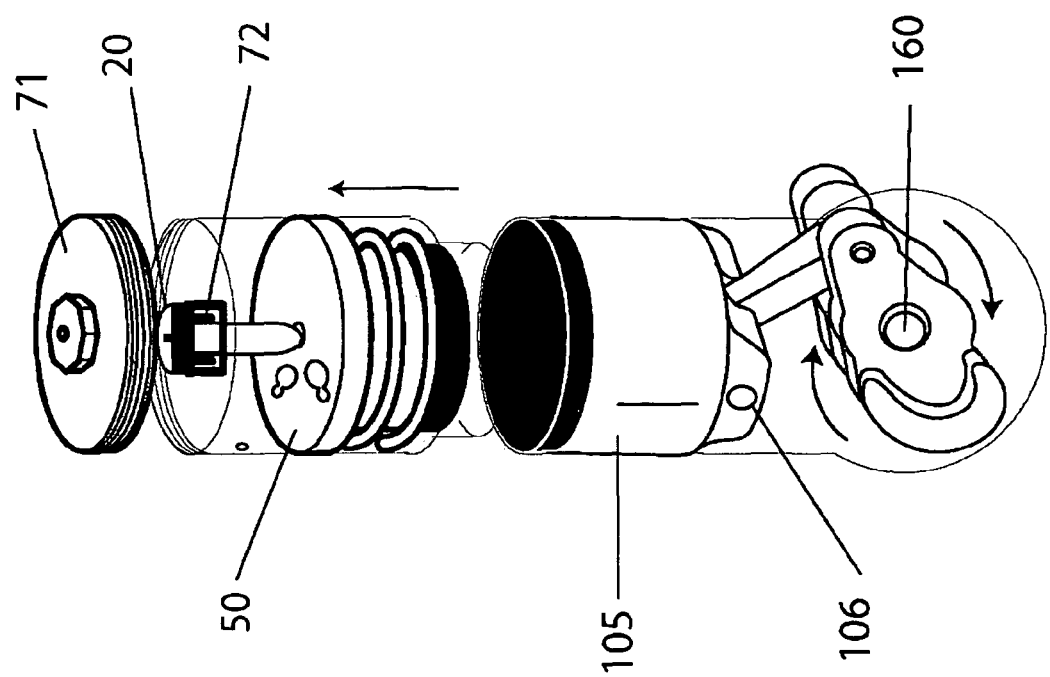
FIG. 5a illustrates a Perspective view of piston

Referring to FIG. 5a, there is shown a perspective view of an actuator (72) engage with one plug assembly (50). As shown, each plug assembly (50) is aligned directly above pistons (105). Each piston (105) is connected by a piston rod (166) to a section of the crankshaft (160).

In the illustrated embodiment 5a, one inch ferro magnet (107), is placed upon the top end of each piston (105), with the positive side up of the magnet facing upward. In this embodiment, the switching of the polarity of the electromagnet (60) on the plug assembly (50) from positive to negative and back again creates a two cycle engine. The piston (105) is attached to the crankshaft (160) by the piston pin (106) and crankshaft rod (115).

In FIG. 3, there are two capped plug assembly (50) which are designated as (150) and one uncapped plug assembly designated as (165). Wire connections (141) are shown connecting the actuators to the ECU (120) I FIG. 2. Wire connections (131) are shown connecting each plug assembly to ECU 120 in FIG. 2.

As shown in FIG. 1b, metal coil (12, 14)) surround the lower end of each rod portion (10, 11) of plug (20, 21) allowing current or (voltage) to pass through it causing plug rod (10, 11) to become magnetized and transfer that magnetism to electromagnetic (60) in FIG. 1e.

Referring to FIG. 5a, the connecting rod (115) connects the bottom end of the piston (105) to the crankshaft (160). It can rotate at both ends so that its angle can change as the piston (105) moves and the crankshaft (160) rotates. The rotational movement of crankshaft (160) forces the upward and downward motion of each piston (105). A conventional sump (162) can be located below the crankshaft (160) for containing some amount of oil bath collecting at the bottom such that as the crankshaft (160) splashes oil under each piston (105) within each cylinder (90).

However, the present invention differs from the conventional engine that contains a spark plug which ignites an air and fuel mixture causing combustion to occur. In the illustrated embodiment in FIG. 1e, the spark plug is replaced with two plugs (10, 11). One plug (i.e. coil and rod) has a positive charge (11), and the other plug (i.e. coil and rod) has a negative charge (10). The plugs (10, 11) are used to change the polarity of the electromagnet (60) which is attached to the bottom of plug assembly (50) to create the magnetic field that propels the engine.

By switching the polarity from (+) positive to (−) negative, to electro-magnets (60) in the head assembly (80) causes the rotational movement of the pistons (105) in the cylinder (90) as shown in FIG. 5a. Having the ignition wired through the ECU (120) in FIG. 2, to the actuators (72) in the head assembly (80) causes the initiation of the magnetic field in the engine. When the ignition key is turned to the ON position an electrical current is sent to the actuators (72) above in the plug assemblies (50) causing each actuator (72) to push downward on its corresponding plug assembly (50), locking the actuator 72 into place as shown in FIG. 2C. FIG. 2b illustrates the ignition key in the off position with the actuator (72) pushed upward away along with plug assembly with spring under the plug assembly.

Referring to FIG. 2d, when the pistons (105) reach the top of their stroke, a signal is sent by the ECU (120) which will cause the switching of the polarity of the electromagnet (60) in the head assembly (80), to (+) positive thereby causing the electromagnet (60) attached to the bottom of each plug assembly (50) and the ferro magnet (107) atop the piston (105) to push away from each other.

Referring to FIG. 2e, when the pistons (105) reach the bottom of their stroke, a signal is sent by the ECU (120) which will cause the switching of the polarity of the electro magnet (60) in the head assembly (80), to (−) positive thereby causing the electromagnet (60) attached to the bottom of each plug assembly (50) and the ferro magnet (107) atop the piston (105) to pull towards each other. Increasing the voltage to the coil and rod causes magnetic induction to the electromagnets (60) in the head assembly (80), thereby allowing magnetic force (moment) to propel a vehicle.

Referring to FIG. 2b, when the ignition key is turned to the Accessory or OFF position, the actuators (72) releases the plug assembly (50), causing the spring (55) to push upward, wherein the engine stops rotating.

Figure 4A:
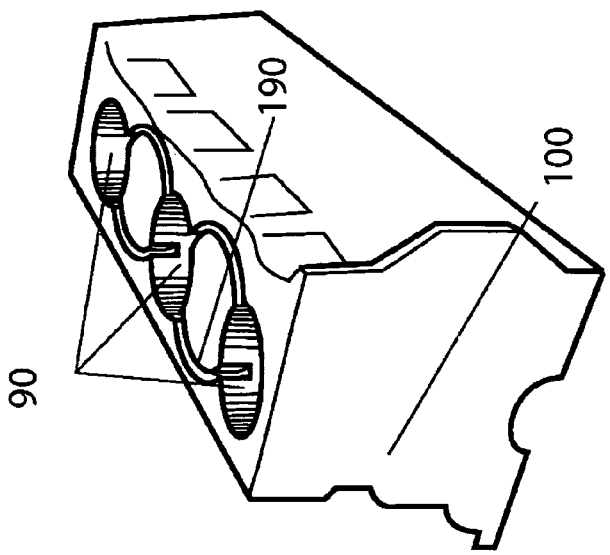
FIG. 4a illustrates a Perspective of block depicting the following (a) block (partial view-one side) (b) cylinders (c) ambient airways for reducing vacuum and compression (*) threaded holes for mounting the heads.
Figure 4:
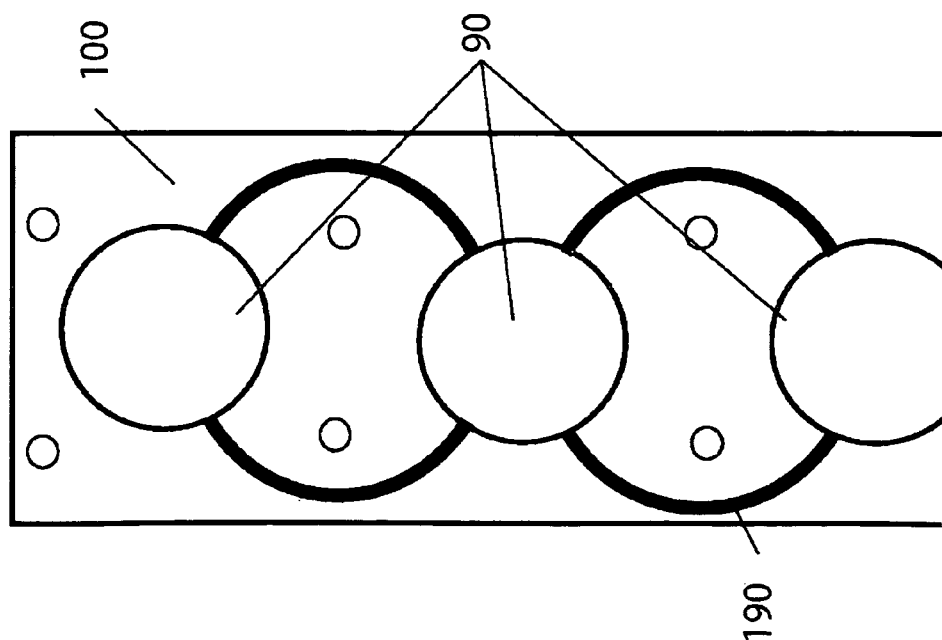
FIG. 4 illustrates a Top view of block

Referring to illustrated embodiment in FIG. 5, roller bearings should be used on the crankshaft (160) and an oil bath (162), instead of an oil pump. This would reduce the wear and maintenance of the engine. Referring to FIGS. 4 and 4a, also, there is the need to reduce the vacuum, and compression in the cylinders (90). This is achieved by having ambient airways (190), located at the top of the cylinder block (100), to join the cylinders (90) together. This allows the ambient air, above and below the pistons (105), to move freely within the sealed unit.

In operation, FIG. 2c shows the actuator (72) disconnected and in the off position. When the actuator (72) is in the off position, then the electromagnet (60) is uncharged and the plug assembly (50) is position upward. When the actuator (72) is in the on position, then the plug assembly (50) is position downward toward piston (105).

In operation, when plug assembly (50) is negatively charged, FIG. 2d shows ferro magnet (107) pulled upward toward electromagnet (60). However, as shown in FIG. 2e when plug assembly (50) is positively charged.

The Engine Control Unit (ECU) (the car's computer) (120) is a microprocessor that uses a closed-loop control to control and performs various jobs in the engine. Smart sensors (150) are attached to the crankshaft (160) which sends signals to the computer (120) to switch the polarity of the electromagnet (60). The cars computer controls the polarity of the electromagnet (60). The ECU (120) sends a signal to the plugs (10,11) thereby causing the switch in polarity of the electromagnet (60). An electromagnet (60) is a device that is only magnetic when an electric current is applied to it. The electromagnet (60) is attached to the bottom of the plug assembly (50).

Referring to FIGS. 1, 1a, and 1b, there is shown various cut views of plug assembly (20, 21). The present invention comprises plug (20) and plug (21). Plug (20) comprises rod (10) inserted into sleeve (16) surrounding by coil (12). Plug (21) comprises rod (11) inserted into a sleeve (16) surrounding by coil (14). As shown in this embodiment coil (20) and rod (10) has a negative charge and coil of rod (21) has a positive charge. The plug (20,21) are placed into carbonized plastic plugs (16) which is then inserted into metal coils (12,14). The part of the coil of rod (10, 11) that carbonized plastic plugs (12, 14) are placed into keyway holes (40) in the plug assembly (50) as shown in FIG. 1e. Also, the actuator (72) slides into the actuator hole (30). As shown in FIG. 1d, the rod portion of plug 10, 11 are used within electromagnet (60). Wires (70) are attached to the metal coils (i.e. copper in this embodiment) (12, 14) so it can transfer electricity through the plugs (10,11) into the electromagnet (60). In the preferred embodiment, the metal coils can be copper or another suitable conductive type of metal.

Situated above the plug assembly (50) is an actuator (72). When the ignition key is tuned on, an electric current is sent through the actuator (72) which moves the plug assembly (50)

downward, and this locks the plug assembly (50) in place and allows the engine to work. When the ignition key is turned off, the electric current stops, the actuator (72) unlocks the plug assembly and the spring under the plug assembly pushes upward, and the engine stops working.

In the preferred embodiment, on the top of each piston (105), there is a one inch, thick Ferro magnet (107) disposed with its positive side up. As the pistons (105) move up and down, the ECU (120) sends a signal to the plug assemblies (50) to change the polarity of the electromagnet (60) on each plug assembly (50).

The engine disclosed in the present invention can be adjusted to be used to replace internal combustion engines. By molding the 90 degree V-type or inline type cylinder block, pistons pins, heads, pistons, fasteners, plugs and the oil pan of carburized plastics, the present invention is more durable and will reduce machining, weight, friction and metallic attraction. The present invention uses the existing 12 voltage system normally employed with self-starting engine utilizing voltage regulators. Magnets, sensors, computers, actuators, magnetos and converters are used to operate and control the applications, as necessary for top performers.

In the preferred embodiment, the magneto (130) or coil packs and voltage regulator provides the power source that controls the engine. To facilitate switching mechanism can be disposed between the computer (120) and the wires connection the switching of the electric current to the plug assembly (50). In a conventional magneto (130) and the coil pack (131) are used to generate the electric current used by the ECU which controls the switching of the polarity in the plug assembly.

The invention claimed is:

1. A Magnetic Engine comprising:
   a head assembly supported by an engine block assembly;
   the head assembly having a plurality of chambers;
   the engine block having a plurality of cylindrical apertures;
   the number of chambers corresponding to the number of cylindrical apertures;
   each chamber disposed atop each cylindrical aperture forming a magnetic flow path between the head assembly and the block assembly;
   a plug assembly disposed in each chamber;
   a piston disposed in each aperture;
   the plug assembly having a bottom side with an electromagnet incorporated therein;
   a positive and negative plug incorporated within each plug assembly;
   the piston having a top side with a ferro-magnet incorporated therein;
   an actuator disposed atop each plug assembly;
   a crankshaft rotationally mounted to a bottom side of each piston;
   a computer having a processor in electronic communications with a sensing mechanism mounted upon the crankshaft, each actuator and each plug assembly;
   when the crankshaft rotates the piston to a bottom stroke, the sensor mechanism sends an electronic signal to the processor causing an electronic signal to be sent to the plug assembly to change polarity of the electro-magnet creating a magnetic field in the magnetic path causing the ferromagnet and the electro-magnet to attract toward each other; and
   when the crankshaft rotates the piston to a top stroke, the sensor mechanism sends an electronic signal to the processor causing an electronic signal to be sent to the plug assembly to change polarity of the electro-magnet by energizing and de-energizing the negative plug and positive plug to change the flow of electric current thereby creating a magnetic field in the magnetic path causing the ferromagnet and the electro-magnet to repel each other.

2. The engine of claim 1 further comprises a sump located beneath the crankshaft with an oil bath located within the sump allowing oil to flowing within the cylinder of the pistons.

3. The engine of claim 1 wherein the block assembly further comprises:
   a plurality of ambient airways mounted atop the block assembly surrounding the cylinders wherein air flows within the cylinders once the pistons are sealed therein.

4. The engine of claim 1 wherein the negative and positive plug further comprises a rod surrounded by a sleeve disposed within a coil.

5. The engine of claim 1 wherein the negative and positive plug has a top end of the rod disposed within the electromagnet with a top end of the coil extending beyond the chamber.

* * * * *